Patented Mar. 30, 1943

2,315,220

UNITED STATES PATENT OFFICE 2,315,220

PROCESS FOR THE MANUFACTURE OF POLYAZOIC DYESTUFFS

Pierre Petitcolas, Rouen, and Robert Frédéric Michel Sureau, Mont St. Aignan, France; vested in the Alien Property Custodian No Drawing. Application September 9, 1938, Serial No. 229,220. In France September 14, 1937

1 Claim. (Cl. 260—157)

It has been found, according to the present invention, that highly valuable dye-stuffs are obtained:

1. By coupling a diazoic derivative of an aromatic amine or of an amine behaving, when diazotizing, as an aromatic amine and containing no group capable of conferring solubility in water with a heterocyclic amine of the form

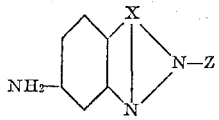

where X represents either $\equiv$CH or $\equiv$CHal or $\equiv$N and Z represents either H or an alkyl group or an aryl group or an aralkyl group or a cycloalkyl group, and 2. By coupling in substance or on the fibre the diazoic derivative of the amino-azoic body which has been thus obtained with a coupling component having a substantive character and by eventually treating, in substance or on the fibre, the polyazoic dye-stuffs thus obtained by means of metallizing agents.

The primary amines which can be used as first components according to the present process may be substituted by groups such as:

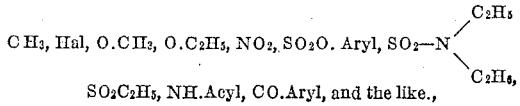

SO$_2$C$_2$H$_5$, NH.Acyl, CO.Aryl, and the like, but not by solubilizing groups such as SO$_3$H, COOH, and the like; furthermore, these amines may be of the benzenic, naphthalenic, isocyclic or heterocyclic series, provided, however, that at least one of the NH$_2$ groups which they contain is diazotizable.

The heterocyclic amines which can be used as second components must be of the type above referred to, having regard to the possibility of one or more substitutions in the benzenic nucleus by such a group as CH$_3$, Hal, O.CH$_3$, O.C$_2$H$_5$ and the like, in positions such that the coupling with the diazoic of the first coupling agent is not hindered. As amines of this kind the following amines can be cited, of course by way of non-limiting example: the 6-amino-indazol of the formula:

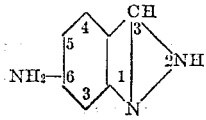

the 6 - amino-methyl-indazol, the 6-amino-3- chloro-indazol, the 6-amino-benz-triazol, of the formula:

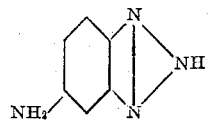

the 6-amino-2-phenyl-benz-triazol, the 6-amino-5-chloro-2-phenyl-benz-triazol; the said amines can be produced by any known processes or by extension of these processes.

Thus, the 6-amino-3-chloro-indazol, which melts at 187° C., can be produced by chlorination of the 6-nitro-indazol and reduction of the latter.

The aminoazoics which are obtained by coupling with the diazoic derivatives the aforementioned heterocyclic amines form bases which do not diazotize generally in the presence of a diluted mineral acid; it is necessary to effect this diazotizing with nitrosyl sulphate or in a medium of organic acid (e. g. formic or acetic acid) in the presence of a concentrated mineral acid with an alkaline nitrite. It is often possible to insulate the diazonium sulphate, which is only slightly soluble in the presence of an excess of sulphuric acid or to precipitate the fluoborate of diazonium by an excess of a solution of fluoborate of sodium.

As coupling components having a substantive character there may be more particularly used the arylides of the orthohydroxy-carbonic acids, the arylides of the acetyl-acetic acids and the like.

The second coupling can be effected on the fibre in dyeing and in printing operations of colouring cotton, viscose or other natural or artificial fibres by means of the known processes. The dye-stuffs which have been produced in natura can be used for colouring lacs, varnishes, latex, paper, plastic materials, rubber, rayon silks in the mass and the like.

The said dye-stuffs offer the interesting property of being convertible into metalliferous lacs and this conversion can also take place in natura and on the fibre.

When this transformation occurs on the fibre, the process according to our present invention is a dyeing process, according to which the fibres which have been coloured by coupling on themselves of the coupling components of substantive character, with the diazoic derivatives of the above described aminoazoics, are treated by metallizing agents. It is possible, for instance, to proceed with the coupling in the presence of copper acetate or to copper the dye-stuffs in a slightly acetic medium at boiling. Generally this treatment causes a strong bathochrome effect simultaneously with a substantial improvement of the fastness to light.

The following examples are given, of course by way of non-limiting examples:

Example 1

13.3 grams of 6-amino-indazol are dissolved in 300 ccm. of water and 10 ccm. of concentrated HCl. Into this solution, which is vigorously stirred, a diazoic solution is poured which has been obtained in the usual manner from 12.7 grams of O.chloraniline. The coupling begins to take place in a mineral acid medium; it is rendered practically complete by adding step by step, a solution of sodium acetate until the reaction is slightly violet on Red Congo paper. The dyestuff is filtered, washed and dried.

27 grams of this dye-stuff are dissolved in 150 ccm. of $H_2SO_4$ at 66° Bé. Into this solution there is poured at ordinary temperature, and with stirring, the solution obtained by mixing:

7.5 grams of solid sodium nitrite and
35 ccm. of $H_2SO_4$ at 66° Bé.

After ¼ hour stirring the solution is poured onto ice and the fluoborate of diazonium is precipitated by a concentrated solution of fluoborate of sodium. The crystals are filtered, washed in icy-cold water and dried in absence of light and at a moderate temperature. Since this diazoic compound is only slightly soluble, it is mixed, for use, with naphthalene-trisulphonate of sodium-1.3.5 and sulphate of alumina: it can be used for dyeing for the production of icy dye-stuffs.

Example 2

2 grams of betanaphthylamide of the betaoxynaphthoic acid are formed in a paste with 2.4 ccm. of denatured alcohol and 0.8 ccm. of a soda solution 34° Bé. The solution is then diluted with 2 ccm. of cold water. A clear solution is quickly obtained. Then 1 ccm. of 33% formaldehyde is added. After having allowed to rest for a few minutes, there is added a litre of water to which has been previously added 5.2 ccm. of soda at 34° Bé. and 5 ccm. of sulphoricinate of soda.

20 grams thoroughly boiled cotton thread are manipulated for an half-hour in this impregnating bath. They are then well pressed out and developed for about 15 minutes in a diazoic bath containing 15 grams of stable diazo of the preceding example (titration about 20% of base).

After a copious rinsing it is then soaped for half an hour at boiling temperature in an alkaline bath containing 2 grams of soap and 2 grams of carbonate of soda per litre. Thus a brown-red tint is obtained having good fastness properties.

If the so dyed cotton is then boiled for a few minutes in a bath containing 5 grams of sulphate of copper and 0.5 ccm. of acetic acid in 500 ccm. of water, a considerable toning from the brown-red to the dark brown is observed.

Example 3

16.8 grams of 6-amino-3-chlorindazol are dissolved in
500 ccm. of water and
10 ccm. of concentrated HCl To this solution there is added a diazoic solution prepared in the usual manner with 13.8 grams of ortho-nitraniline. The coupling is achieved by neutralizing with a solution of acetate of soda as in Example 1.

The dye-stuff is filtered, washed and dried. The diazotizing, the stabilization of the diazo and the dilution are effected as in Example 1.

A dyeing operation which has been effected under the conditions of Example 2 gives a full brown passing to "negro-head" brown by coppering.

The following table gives the tints which have been obtained with different components:

| First component | Second component | Third component | Tint prior to coppering | Tint after coppering |
|---|---|---|---|---|
| Aniline | 6-aminoindazol | Betanaphthylamide of the 2-3 oxynaphthoic acid. | Brown yellow | Dark yellowish brown. |
| O-chloraniline | do | Anilide id | Reddish-brown | Dark brown. |
| Do | do | Betanaphthylamide id | do | Do. |
| O-nitraniline | do | do | Dark brown | Black brown. |
| Do | do | 2.4.-dimethoxy-5-chloranilide | do | Do. |
| Do | do | p-Anisidide of the beta-oxy-naphthoic acid. | do | Do. |
| 2-methyl-5-nitro-aminobenzene | do | Betanaphthylamide id | Brown-red | Dark brown. |
| 2-methoxy-5-nitro-aminobenzene | do | Id | do | Black brown. |
| 2.5.-dichloro-aniline | do | Id | do | Violet brown. |
| 2-nitro-4 methyl-aminobenzene | do | Id | Intensive brown | Blackish brown. |
| 2-nitro-4-chloro id | do | Id | Black brown | Black. |
| 2.4.- dinitraniline | do | Id | Brownish black | Do. |
| Phenylic ether of the 5-chloro-aminobenzene-2-sulphonic acid. | do | Id | Very dark brown | Do. |
| O-nitraline | 3-chloro-6-aminoindazol. | Id | Dark brown | Brown-black. |
| O-chloraniline | 2,methyl-6-aminoindazol. | Id | Khaki | Brownish olive. |
| O-nitraniline | 6-amino-benz-triazol. | Id | Reddish brown | Dark brown. |

What we claim is:

A process for the production of polyazoic dyestuffs which consists in coupling a diazoic derivative of an amine of the benzene series, of which at least one $NH_2$ group is diazotizable, and containing no group capable of conferring solubility in water, with 6-amino-indazol of the formula:

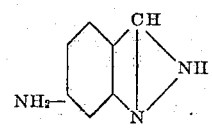

diazotizing the coupling product obtained and coupling the diazoic derivative finally obtained with a member of the group consisting of the arylides of the orthohydroxy carbonic acids and the arylides of the acetylacetic acids.

PIERRE PETITCOLAS.
ROBERT FRÉDÉRIC MICHEL SUREAU.